United States Patent
Kinoshita et al.

(10) Patent No.: US 9,823,862 B2
(45) Date of Patent: Nov. 21, 2017

(54) STORAGE SYSTEM

(71) Applicant: Toshiba Memory Corporation, Minato-ku (JP)

(72) Inventors: Atsuhiro Kinoshita, Kamakura (JP); Junichi Hoshino, Setagaya-ku (JP); Takahiro Kurita, Sagamihara (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 359 days.

(21) Appl. No.: 14/314,383

(22) Filed: Jun. 25, 2014

(65) Prior Publication Data
US 2015/0227320 A1    Aug. 13, 2015

(30) Foreign Application Priority Data

Feb. 10, 2014   (JP) ................................. 2014-023437

(51) Int. Cl.
G06F 12/00   (2006.01)
G06F 3/06   (2006.01)
G06F 15/163   (2006.01)

(52) U.S. Cl.
CPC .......... *G06F 3/0619* (2013.01); *G06F 3/0659* (2013.01); *G06F 3/0688* (2013.01); *G06F 15/163* (2013.01)

(58) Field of Classification Search
CPC .... G06F 3/0619; G06F 3/0659; G06F 3/0688; G06F 11/00; G06F 13/00; G06F 15/163
See application file for complete search history.

(56) References Cited

U.S. PATENT DOCUMENTS

| | | | |
|---|---|---|---|
| 6,457,100 B1 | 9/2002 | Ignatowski et al. | |
| 7,016,213 B2 | 3/2006 | Reeves et al. | |
| 7,849,303 B2* | 12/2010 | Miller | H04L 9/0825 713/150 |
| 8,510,538 B1* | 8/2013 | Malewicz | G06F 7/38 712/220 |
| 9,389,808 B2 | 7/2016 | Kurita et al. | |
| 2003/0110329 A1* | 6/2003 | Higaki | G06F 9/4843 710/36 |
| 2008/0114896 A1* | 5/2008 | Holt | G06F 9/54 709/238 |

(Continued)

FOREIGN PATENT DOCUMENTS

| | | |
|---|---|---|
| JP | 3722415 | 11/2005 |
| JP | 4836794 | 12/2011 |

(Continued)

*Primary Examiner* — Charles Rones
*Assistant Examiner* — Nanci Wong
(74) *Attorney, Agent, or Firm* — Oblon, McClelland, Maier & Neustadt, L.L.P.

(57) ABSTRACT

According to one embodiment, a storage system includes a plurality of memory nodes that are connected to each other in a plurality of different directions. Each memory node stores a count value. Each memory node, when receiving an update command of which destination is not own memory node, transmits the update commando to other memory nodes connected thereto. Each memory node, when receiving an update command of which destination is own memory node, executes the update command, increases the stored count value, and issues a notice indicating the increased count value.

4 Claims, 12 Drawing Sheets

(56) References Cited

U.S. PATENT DOCUMENTS

| | | | |
|---|---|---|---|
| 2010/0185804 A1* | 7/2010 | Omizo | G06F 12/0246 711/103 |
| 2010/0268808 A1* | 10/2010 | Chkodrov | G06F 11/2028 709/223 |
| 2012/0117354 A1 | 5/2012 | Tatsumura et al. | |
| 2013/0094509 A1* | 4/2013 | Chen | H04L 69/22 370/392 |
| 2013/0159638 A1 | 6/2013 | Koinuma et al. | |
| 2013/0254240 A1 | 9/2013 | Kurita et al. | |
| 2013/0339000 A1* | 12/2013 | Zhang | G06F 17/277 704/9 |
| 2014/0164324 A1* | 6/2014 | Hursh | G06F 17/30578 707/613 |
| 2014/0195710 A1 | 7/2014 | Sasaki et al. | |
| 2014/0201439 A1 | 7/2014 | Sasaki et al. | |
| 2015/0058436 A1 | 2/2015 | Kurita et al. | |
| 2015/0134602 A1* | 5/2015 | Nicholas | G06F 17/30345 707/609 |
| 2015/0163127 A1* | 6/2015 | Garcia-Luna-Aceves | H04L 43/10 709/242 |

FOREIGN PATENT DOCUMENTS

| | | |
|---|---|---|
| JP | 2012-103926 | 5/2012 |
| JP | 2013-130976 | 7/2013 |
| JP | 2013-196565 | 9/2013 |
| JP | 2014-134981 A | 7/2014 |
| JP | 2014-137758 A | 7/2014 |
| JP | 2015-41281 A | 3/2015 |
| WO | WO 2004/102403 A3 | 11/2004 |

\* cited by examiner

STORAGE SYSTEM

CROSS-REFERENCE TO RELATED APPLICATIONS

This application is based upon and claims the benefit of priority from Japanese Patent Application No. 2014-023437, filed on Feb. 10, 2014; the entire contents of which are incorporated herein by reference.

FIELD

Embodiments described herein relate generally to a storage system.

BACKGROUND

In recent years, information processing apparatuses including storage systems have been connected to each other by a network and have operated as one information processing system (for example, cloud computing). In addition, there is a storage system in which a plurality of DRAM chips or NAND flash chips with a higher processing speed than an HDD according to the related art are arranged and connected to each other by inter-chip wiring.

DETAILED DESCRIPTION

In general, according to one embodiment, a storage system includes a plurality of memory nodes that are connected to each other in a plurality of different directions. Each memory node stores a count value. Each memory node, when receiving an update command of which destination is not own memory node, transmits the update commando to other memory nodes connected thereto. Each memory node, when receiving an update command of which destination is own memory node, executes the update command, increases the stored count value, and issues a notice indicating the increased count value.

Exemplary embodiments of a storage system will be explained below in detail with reference to the accompanying drawings. The present invention is not limited to the following embodiments.

Figure 1:
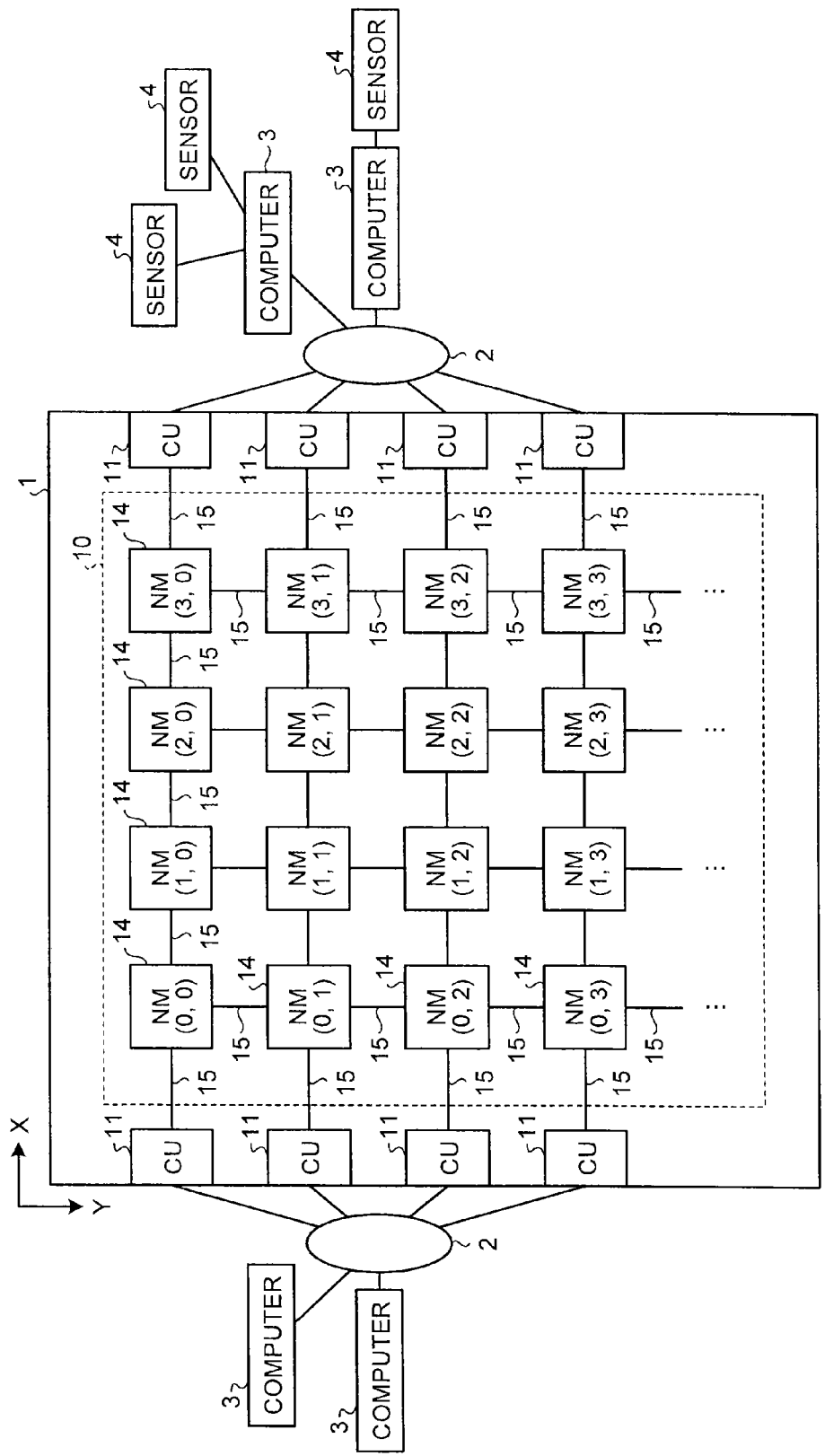
FIG. 1 is a diagram illustrating an example of the structure of a storage system according to a first embodiment.

FIG. 1 is a diagram illustrating an example of the structure of a storage system according to a first embodiment.

A storage system 1 is configured such that one or more computers 3 can be connected to each other through a network 2. A sensor 4 may be connected to the computer 3. The sensor 4 is a device which outputs data. The sensor 4 may output weather data, such as temperature, sunshine, a wind direction, or a wind velocity. In addition, the sensor 4 may be a monitoring camera which is provided in a plant or a building, or on a road and outputs an image or a moving image as data. The sensor 4 may be an automatic ticket gate which outputs ticket check records as data. The sensor 4 may be a register terminal which outputs the purchase records of customers as data. The computer 3 to which the sensor 4 is connected can transmit a request to register the data output from the sensor 4 to the storage system 1. In addition, the computer 3 can register arbitrary data in the storage system 1. The computer 3 can transmit a request to read the data registered in the storage system 1 to the storage system 1.

The storage system 1 includes a storage unit 10 and a connection unit (CU) 11.

The storage unit 10 has a structure in which a plurality of node modules (NM) 14, each having a storage function and a data transmission function, are connected to each other by a mesh network. The storage unit 10 stores data to be distributed to the plurality of NMs 14. The data transmission function has a transmission mode which enables each NM 14 to effectively transmit packets.

FIG. 1 illustrates an example of a rectangular network in which each NM 14 is arranged at each lattice point. It is assumed that the coordinates of the lattice point are represented by coordinates (x, y) and the positional information of the NM 14 arranged at the lattice point corresponds to the coordinates of the lattice point and is represented by a node address $(x_D, y_D)$. In the example illustrated in FIG. 1, the NM 14 which is arranged at the upper left corner has a node address (0, 0) of the origin and each NM 14 is moved in the horizontal direction (X direction) and the vertical direction (Y direction) so that the integer value of the node address increases or decreases.

Each NM 14 includes two or more interfaces 15. Adjacent NMs 14 are connected to each other through the interface 15. Each NM 14 is connected to other NMs 14 which are adjacent to the NM 14 in two or more different directions. For example, a NM 14 which is arranged at the upper left corner in FIG. 1 and is represented by the node address (0, 0) is connected to a NM 14 which is adjacent in the X direction and is represented by a node address (1, 0) and a NM 14 which is adjacent in the Y direction different from the X direction and is represented by a node address (0, 1). In addition, a NM 14 which is represented by a node address (1, 1) in FIG. 1 is connected to four NMs 14 which are adjacent in four different directions and are represented by node addresses (1, 0), (0, 1), (2, 1) and (1, 2). Hereinafter, in some cases, a NM 14 which is represented by a node address ($x_D$, $y_D$) is referred to as a node ($x_D$, $y_D$).

FIG. 1 illustrates each NM 14 arranged at the lattice point of the rectangular lattice. However, the arrangement of each NM 14 is not limited to this example. That is, the shape of the lattice may be, for example, a triangle or a hexagon as long as each NM 14 arranged at the lattice point is connected to other NMs 14 which are adjacent in two or more different directions. In FIG. 1, the NMs 14 are two-dimensionally arranged. However, the NMs 14 may be three-dimensionally arranged. When the NMs 14 are three-dimensionally arranged, each NM 14 can be designated by three values (x, y, z). When the NMs 14 are two-dimensionally arranged, the NMs 14 which are disposed on the opposite sides may be connected to each other. In this way, the NMs 14 are connected in a torus shape.

The CU 11 includes a connector which is connected to the network 2. The CU 11 can input or output data to or from the storage unit 10, in response to the request which is received from the computer 3 through the network 2.

Figure 2:
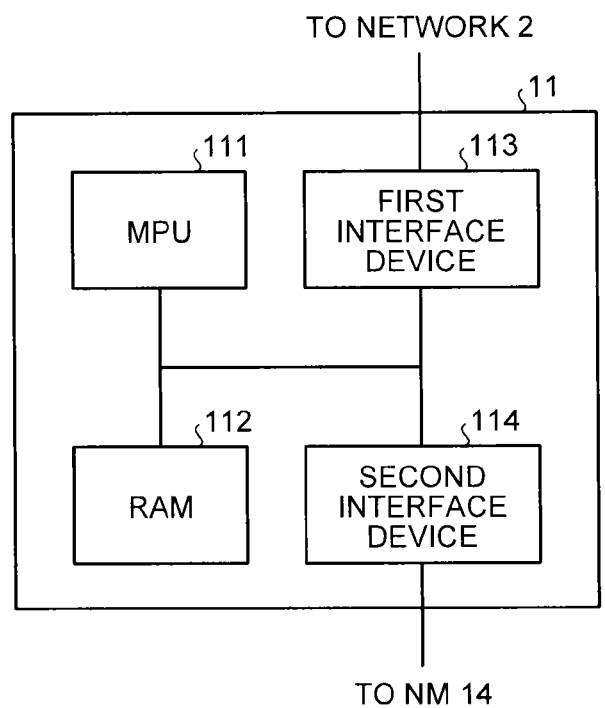
FIG. 2 is a diagram illustrating an example of the structure of a CU.

FIG. 2 illustrates an example of the structure of the CU 11. The CU 11 includes a microprocessor (MPU) 111, a random access memory (RAM) 112 which is used as a main memory, a first interface device 113, and a second interface device 114. The first interface device 113 is used for connection to the network 2. The second interface device 114 is used for communication with the NM 14. The MPU 111, the RAM 112, the first interface device 113, and the second interface device 114 are connected to each other by a bus. A plurality of first interface devices 113 and a plurality of second interface devices 114 may be provided. In addition, the CU 11 may include a non-volatile memory different from the RAM 112.

For example, ARM A9 or Intel Core i7 can be used as the MPU 111. In this case, for example, an AMBA bus or a Quick Path Interconnect (QPI) bus can be used as the bus corresponding to the MPU 111. For example, a volatile memory, such as a DRAM, can be used as the RAM 112. In addition, a MRAM, a PcRAM, or a RRAM (registered trademark) can be used as the RAM 112. For example, a network interface, such as Ethernet (registered trademark), InfiniBand, or Fiber Channel, can be used as the first interface device 113 corresponding to a network communication unit which performs communication with an external network. In addition, for example, an external bus, such as PCI Express, Universal Serial Bus, or Serial Attached SCSI, or a storage interface can be used as the first interface device 113.

The MPU 111 can execute a server application program while using the RAM 112 as a work area. The CU 11 processes a request from the outside under the control of the server application program. The server application program includes a database program. The CU 11 accesses the storage unit 10 while processing the request from the outside. When accessing the storage unit 10, the CU 11 generates a packet which can be transmitted or executed by the NM 14 and transmits the generated packet to the NM 14 connected to the CU 11.

In the example illustrated in FIG. 1, the storage system 1 includes eight CUs 11. The eight CUs 11 are respectively connected to different NMs 14. In this embodiment, four of the eight CUs 11 are connected one-to-one with a node (0, 0), a node (0, 1), a node (0, 2), and a node (0, 3). The other four CUs among the eight CUs 11 are connected one-to-one with a node (3, 0), a node (3, 1), a node (3, 2), and a node (3, 3). An arbitrary number of CUs 11 may be provided. The CU 11 can be connected to any NM 14 forming the storage unit 10. One CU 11 may be connected to a plurality of NMs 14, or one NM 14 may be connected to a plurality of CUs 11. The CU 11 may be connected to any of the plurality of NMs 14 forming the storage unit 10.

Figure 3:
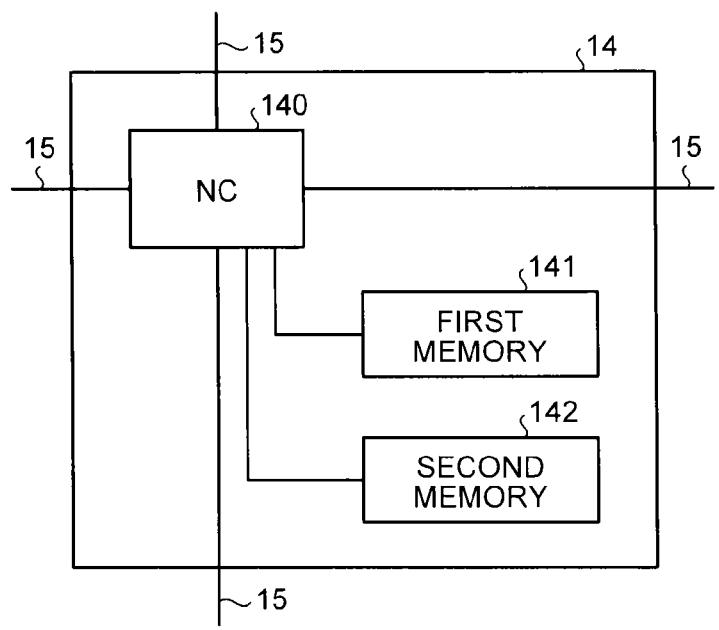
FIG. 3 is a diagram illustrating an example of the structure a NM.

FIG. 3 is a diagram illustrating an example of the structure of the NM 14. The NM 14 includes a node controller (NC) 140 which is a processor, a first memory 141 which functions as a storage, and a second memory 142 which is used as a work area by the NC 140. For example, a NAND memory, a bit-cost scalable memory (BiCS), a magnetoresistive memory (MRAM), a phase-change memory (PcRAM), a resistance random access memory (RRAM (registered trademark)), or a combination thereof can be used as the first memory 141. For example, various types of RAMs can be used as the second memory 142. When the first memory 141 functions as a work area, the second memory 142 may not be provided in the NM 14.

Four interfaces 15 are connected to the NC 140. The NC 140 operates under the control of a predetermined program. The NC 140 receives a packet from the CU 11 or other NMs 14 through the interface 15 or transmits a packet to the CU 11 or other NMs 14 through the interface 15. The interface 15 is based on an arbitrary standard. For example, low voltage differential signaling (LVDS) can be used as the standard of the interface 15. The standard of the interface 15 which connects the NMs 14 may be different from the standard of the interface 15 which connects the NM 14 and the CU 11.

When a destination (packet destination) of the received packet is the NM 14, the NC 140 performs a process corresponding to the packet (a command recorded in the packet). For example, when the command is a read command, the NC 140 reads data from the first memory 141. When the command is a write command, the NC 140 writes data to the first memory 141. When the command is an erase command, the NC 140 erases data from the first memory 141. When the packet destination is not the NM 14, the NC 140 transmits the packet to another NM 14 connected to the NM 14.

Figure 4:
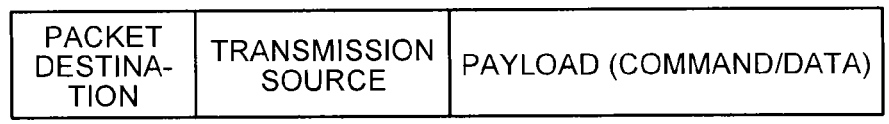
FIG. 4 is a diagram illustrating the structure of a packet.

FIG. 4 is a diagram illustrating the structure of the packet. The packet includes the node address of a packet destination, the node address of a transmission source, and a payload. A command or data, or both the command and the data are recorded in the payload.

The NC 140 which has received the packet determines a routing destination on the basis of a predetermined transmission algorithm and the packet is transmitted between the NMs 14 and reaches the packet destination NM 14. The routing destination means one NM 14 among a plurality of NM 14 which are connected to the NM 14 having received the packet. For example, the NC 140 determines, as a routing destination NM 14, the NM 14 which is disposed on a path from the NM 14 to the packet destination NM 14, through which the packet is transmitted a minimum number of times, among a plurality of NMs 14 connected to the NM 14. When there are a plurality of paths from the NM 14 to the packet destination NM 14, through which the packet is transmitted a minimum number of times, the NC 140 selects one path from the plurality of paths using an arbitrary method. When the NM 14 that is disposed on the path, through which the packet is transmitted a minimum number of times, among the plurality of NMs 14 connected to the NM 14 is out of order or busy, the NC 140 determines another NM 14 as the routing destination.

In the storage unit 10, since the plurality of NMs 14 are connected to each other by the mesh network, there are a plurality of paths through which the packet is transmitted a minimum number of times. Even when a plurality of packets are issued to a specific NM 14 as the packet destination, a reduction in the overall throughput of the storage system 1 due to the concentration of access to the specific NM 14 is prevented since the plurality of issued packets are distributed and transmitted to the plurality of paths by the above-mentioned transmission algorithm.

Figure 5:
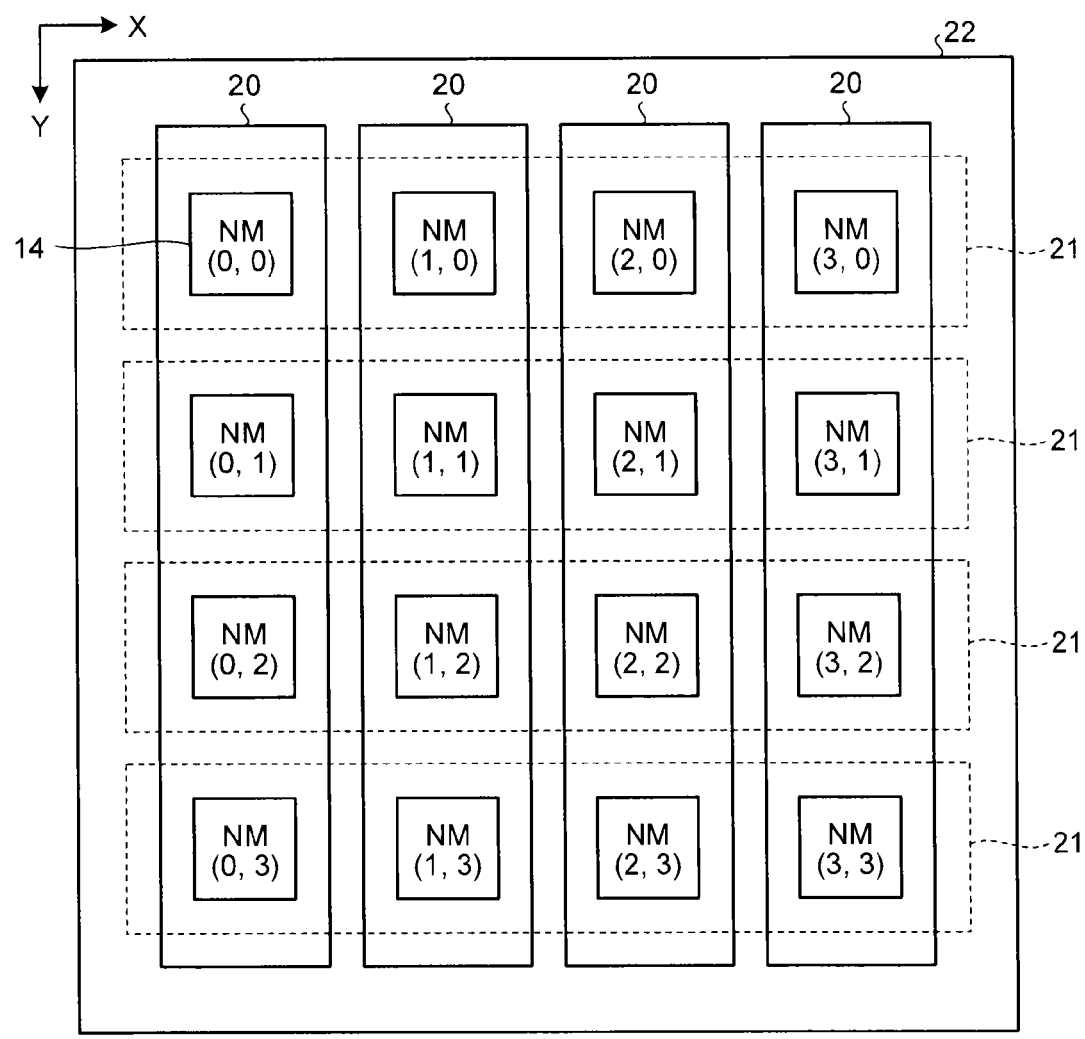
FIG. 5 is a diagram illustrating an example of the mounting of the NMs.

FIG. 5 is a diagram illustrating an example of the mounting of the NMs 14. Each NM 14 is mounted on any one of four card boards 20. The four card boards 20 are detachably mounted on a backplane 22 through connectors. Four NMs 14 are mounted on each card board 20. Four NMs 14 which are arranged in the Y direction are mounted on the same card board 20 and four NMs 14 which are arranged in the X direction are mounted on different card boards 20. In this embodiment, it is possible to construct Redundant Arrays of Inexpensive Disks (RAID) in the storage unit 10. For example, in the example illustrated in FIG. 5, four RAID groups 21 are constructed and each NM 14 belongs to any one of the four RAID groups 21. The four NMs 14 which are mounted on different card boards 20 form one RAID group 21. In this embodiment, the four NMs 14 which are arranged in the X direction belong to the same RAID group 21. An arbitrary level of the RAID is applied. For example, in a case in which RAID5 is applied, when one of the plurality of NMs 14 forming the RAID group 21 is damaged, the card board 20 having the damaged NM 14 is replaced and data stored in the damaged NM 14 is restored. In a case in which RAID6 is applied, even when two of the plurality of NMs 14 forming the RAID group 21 are damaged, it is possible to restore data.

Figure 6:
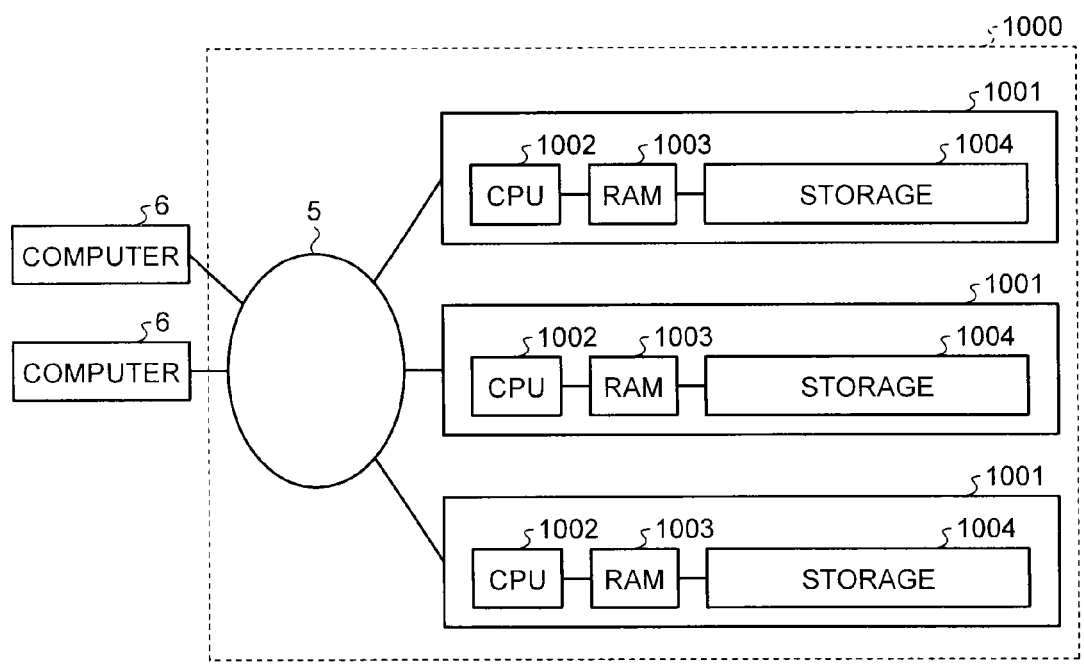
FIG. 6 is a diagram illustrating an example of a storage system with a structure which is compared with that of the storage system according to the first embodiment.

FIG. 6 is a diagram illustrating an example of a storage system with a structure which is compared with that of the storage system 1 according to the first embodiment. A storage system 1000 is configured such that a plurality of servers 1001, each having a CPU 1002, a RAM 1003, and a storage 1004, are connected to a network 5. An external computer 6 can access each server 1001 through the network 5. The servers 1001 are distinguished from each other by node numbers. When the storage system 1000 is used to operate a database, data stored in the storages 1004 of other servers 1001 is cached in the RAM 1003 of each server 1001 such that desired data can be rapidly output even though the computer 6 accesses the server 1001 with any node number. In this case, data is transmitted between the servers 1001 in order to maintain the consistency between cache data and master data. When data is transmitted between the servers 1001, a delay occurs due to an operation performed by the CPU 1002 and transmission through the network 5.

In contrast, in the storage system 1 according to the first embodiment, a plurality of NMs 14 with the storage function are connected to each other by the mesh network. Therefore, each of the plurality of CUs 11 can access one NM 14, without passing through the external network 2. Since the structure in which data stored in one NM 14 is cached in other NMs 14 does not need to be mounted, it is not necessary to transmit data between the NMs 14 in order to maintain cache consistency.

In the first embodiment, a count value corresponding to the number of updates is given to data stored in the NM 14. The term "update" includes, specifically, overwriting and erasing. The update is performed in response to the request which is received by the CU 11 from the computer 3. The count value is notified to the CU 11 which has issued the packet for updating the data. The CU 11 which is notified of the count value records the request which causes the update as a backup so as to be associated with the notified count value.

In this embodiment, it is assumed that the count value is given to each data item and is independently increased for each data item. The storage position (or information corresponding to the storage position) of the data is designated from the outside and the data is a set of values which are input and output and is a set of minimum units. The storage position which is designated from the outside is, for example, an address. The information corresponding to the storage position corresponds to, for example, a key when a key-value store (KVS) is mounted in the storage system 1. When the data is updated, the count value given to the data is increased.

The count value may be given to each predetermined storage area. For example, one count value may be given to each NM 14. In addition, one count value may be given to each first memory 141. A memory space which is provided to the outside by the storage unit 10 may be divided into a plurality of partial memory spaces and one count value may be given to each partial memory space. When data in the storage area to which the count value is given is updated, the count value given to the storage area is increased.

Figure 7:
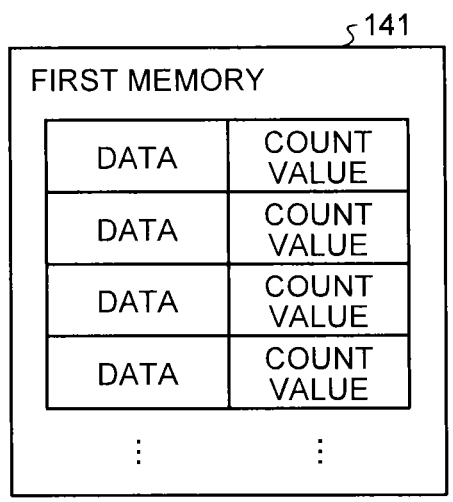
FIG. 7 is a diagram illustrating the memory structure of a first memory.
Figure 8:
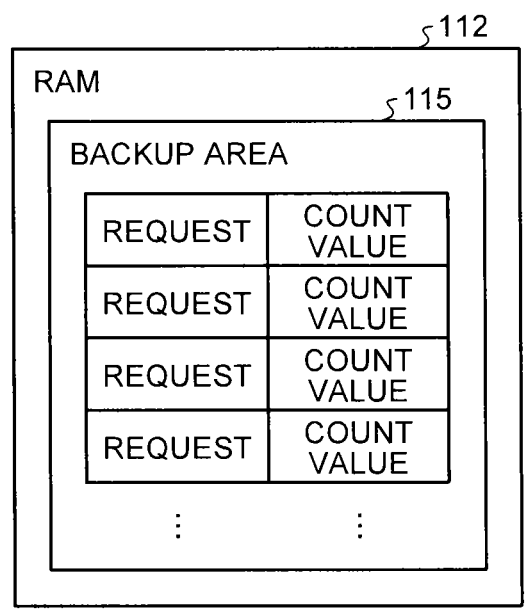
FIG. 8 is a diagram illustrating the memory structure of a RAM.

FIG. 7 is a diagram illustrating the memory structure of the first memory 141 and FIG. 8 is a diagram illustrating the memory structure of the RAM 112. A pair of each data item and the count value is stored in the first memory 141. A backup area 115 is ensured in the RAM 112. Requests are recorded in the backup area 115 so as to be associated with the count values.

Figure 9:
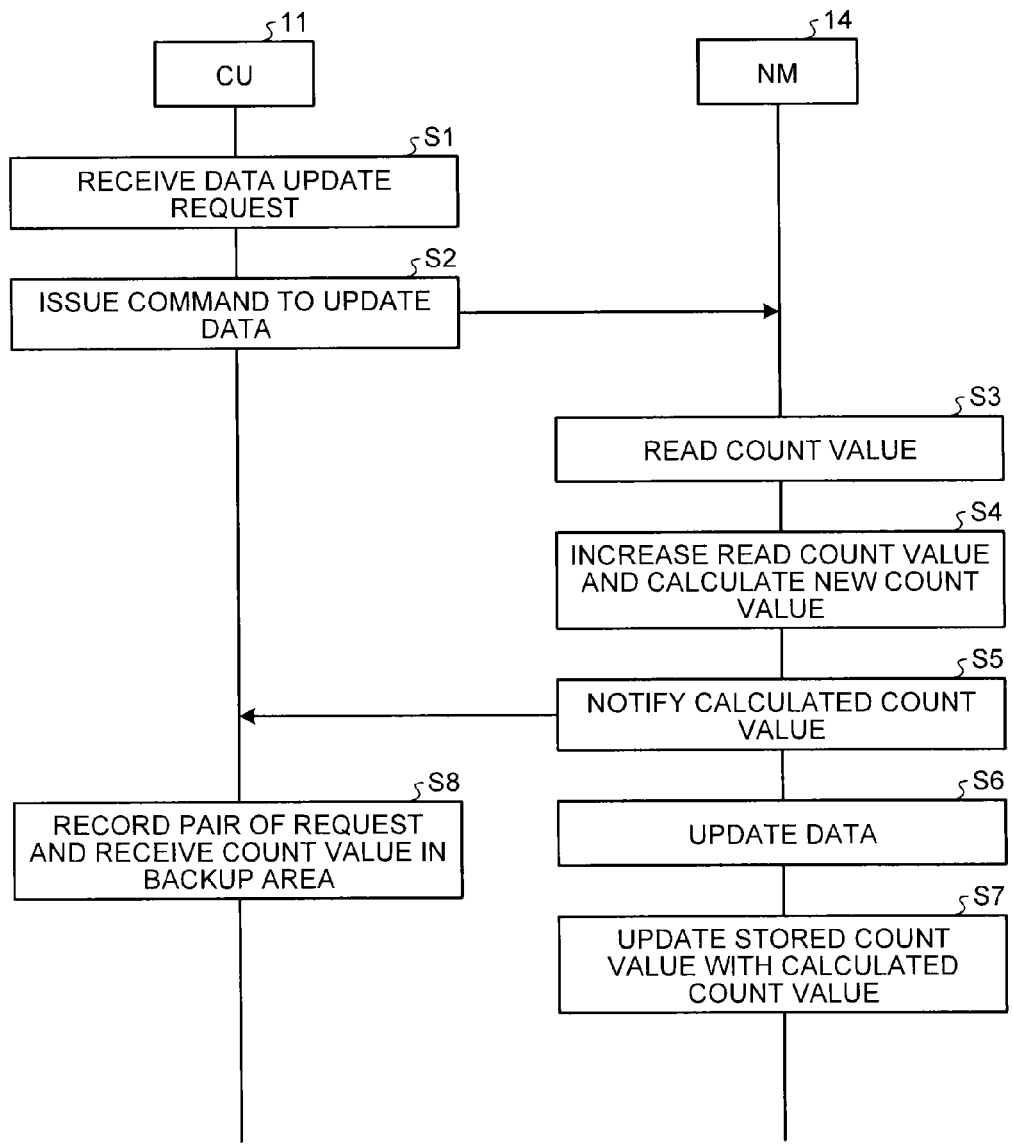
FIG. 9 is a diagram illustrating the operation of the storage system according to the first embodiment.

FIG. 9 is a diagram illustrating the operation of the storage system 1 according to the first embodiment. Specifically, the operation of the CU 11 illustrated in FIG. 9 is performed by the MPU 111 of the CU 11. Specifically, the operation of the NM 14 illustrated in FIG. 9 is performed by the NC 140 of the NM 14.

When receiving a data update request from the computer 3 (S1), the CU 11 issues a data update command to the storage unit 10 (S2). The command is recorded in the payload of the packet. The packet destination recorded in the packet is determined by the storage position which is given to the request received by the CU 11 or the information corresponding to the storage position.

For example, when an address is designated from the outside, the CU 11 may calculate the packet destination NM 14 from the designated address. For example, the relationship between the address and each NM 14 is predetermined. For example, a portion of a bit string forming the address is used as information for specifying one NM 14.

For example, when the KVS is mounted, the CU 11 may convert the key into an address and calculate the packet destination from the converted address. In addition, a predetermined NM 14 may convert the key into an address and the CU 11 may determine the NM 14 which can perform the conversion as the packet destination. The NM 14 which can perform the conversion converts the key into an address, calculates a next packet destination from the converted address, and transmits a command to the next packet destination.

When the request is a request to overwrite data, the request includes data. When the request is a request to erase data, the request may not include data.

When receiving a command, the NM 14 reads the count value of the data to be updated from the first memory 141 (S3). Then, the NM 14 increases the read count value and calculates a new count value (S4). Then, the NM 14 notifies the CU 11, which is a command transmission source, of the calculated count value (S5). The count value is notified in the form of a packet. The NM 14 updates data (S6) and updates the count value of the data with the calculated count value (S7).

When receiving the notice indicating the count value, the CU 11 additionally records a pair of the request received in S1 and the notified count value in the backup area 115 (S8).

Figure 10:
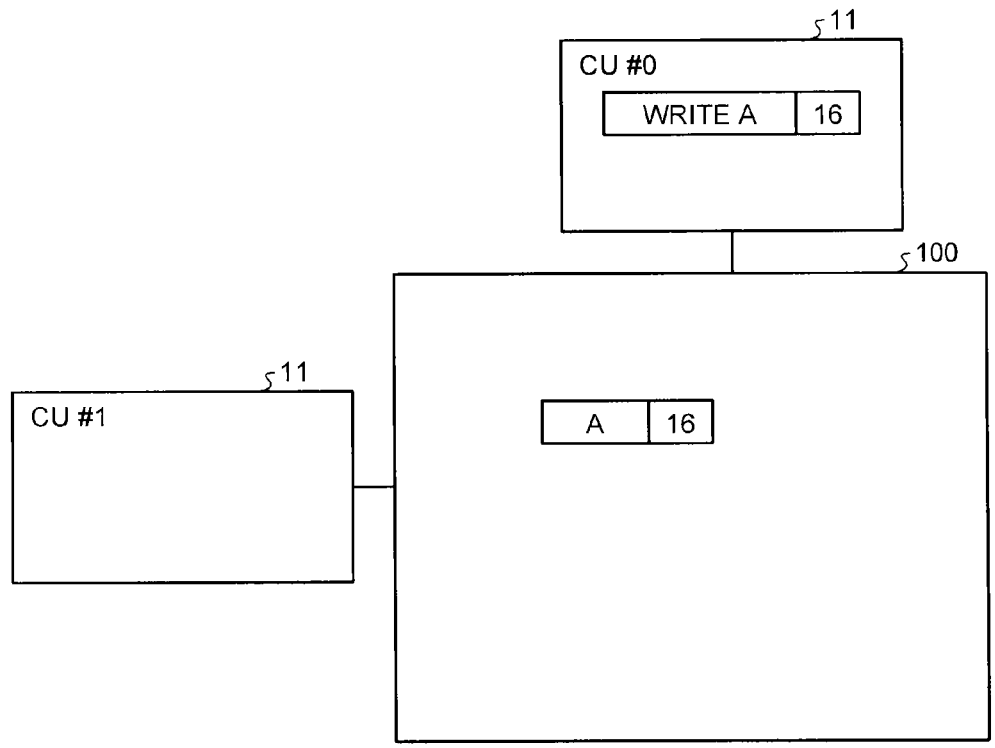
FIG. 10 is a diagram illustrating an example of the detailed operation of the storage system according to the first embodiment.
Figure 11:
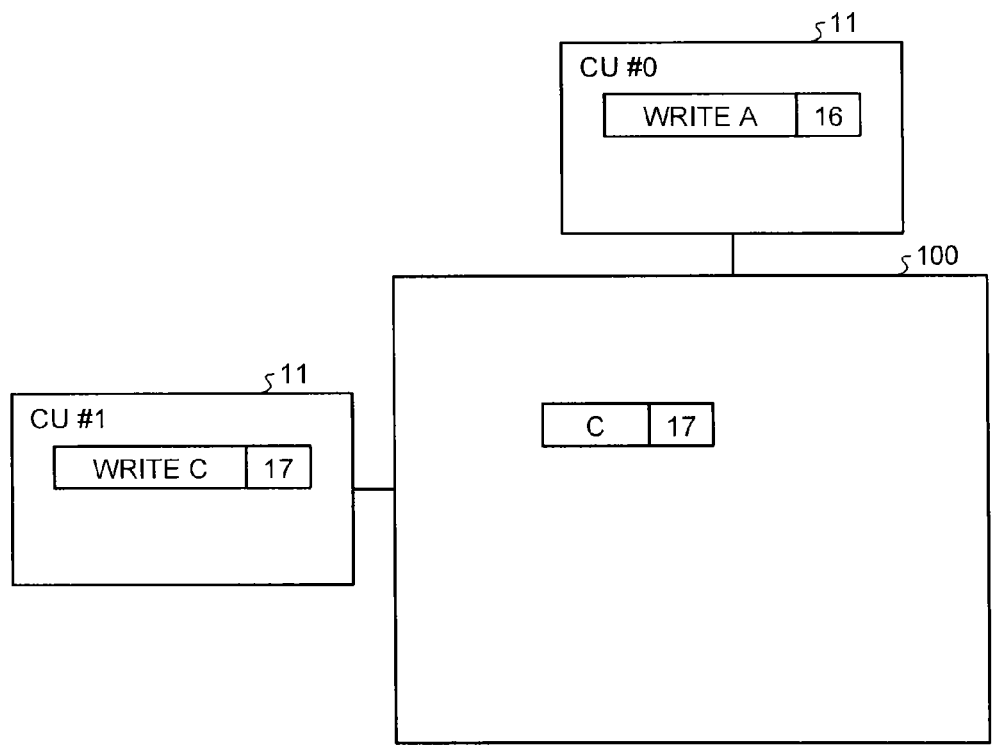
FIG. 11 is a diagram illustrating an example of the detailed operation of the storage system according to the first embodiment.
Figure 12:
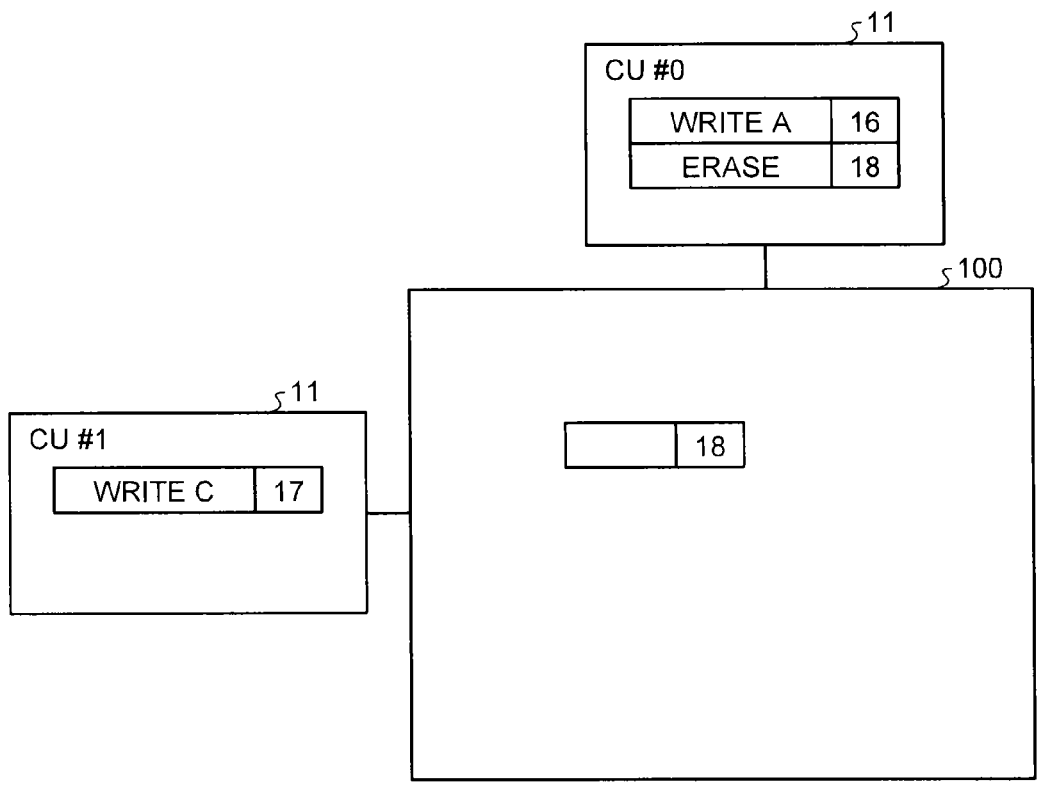
FIG. 12 is a diagram illustrating an example of the detailed operation of the storage system according to the first embodiment.

FIGS. 10 to 12 are diagrams illustrating an example of the detailed operation of the storage system 1 according to the first embodiment. Reference numeral 100 indicates the memory space configured by the storage unit 10. A case in which two CUs 11 update the memory space 100 will be described. Numbers are given to the two CUs 11 so as to be distinguished from each other, as CU#0 and CU#1.

As illustrated in FIG. 10, CU#0 executes a request to write a value "A". A pair of the value "A" and a count value "16" is stored in the memory space 100 and CU#0 records a pair of a request to "write A" and the count value "16" in the backup area 115 provided in CU#0.

Then, as illustrated in FIG. 11, CU#1 executes a request to write (overwrite) a value "C" to the position indicated by the address to which the value "A" is written in FIG. 10. In the memory space 100, the value "A" is overwritten to the value "C" and the count value is updated to "17". In addition, CU#1 records a pair of a request to "write C" and the count value "17" in the backup area 115 provided in CU#1.

Then, as illustrated in FIG. 12, CU#0 executes a request to designate the address to which the value "C" is written and to erase data. The value "C" written to the memory space 100 is erased and the count value is updated to "18". CU#0 adds an "erase" request and the count value "18" to the backup area 115.

As described above, the NM 14 increases the count value whenever data is updated and notifies of the increased count value. The CU 11 stores a pair of the notified count value and the request. Since the count value corresponds to a chronological order, the CU 11 can re-execute a request for an arbitrary count value stored therein to restore data in the NM 14 to the state when the count value is calculated. Since the data in the NM 14 can be restored to the state at an arbitrary time, convenience is improved.

For example, the storage system 1 may issue a transaction ID to each request and each request may be recorded in the backup area 115 so as to be associated with the count value and the transaction ID. In this case, when a transaction ID is designated, the storage system 1 can restore data in the NM 14 to the state when a request for the designated transaction ID is executed. In addition, the storage system 1 may issue a time stamp to each request and each request may be recorded in the backup area 115 so as to be associated with the count value and the time stamp. In this case, when the past time is designated, the storage system 1 can restore data in the NM 14 to the state at the designated time.

(Second Embodiment)

In each NM 14 provided in a storage system 1, a NC 140 can perform various processes, which makes it possible for the storage system 1 to implement the same functions as MapReduce. The process of the MapReduce is formed by a map phase, a shuffle and sort phase, and a reduce phase. In the map phase, a plurality of pairs of keys and values are generated. In the shuffle and sort phase, the plurality of pairs generated in the map phase are classified according to each key. In the reduce phase, the values which form pairs together with each key are aggregated.

Figure 13:
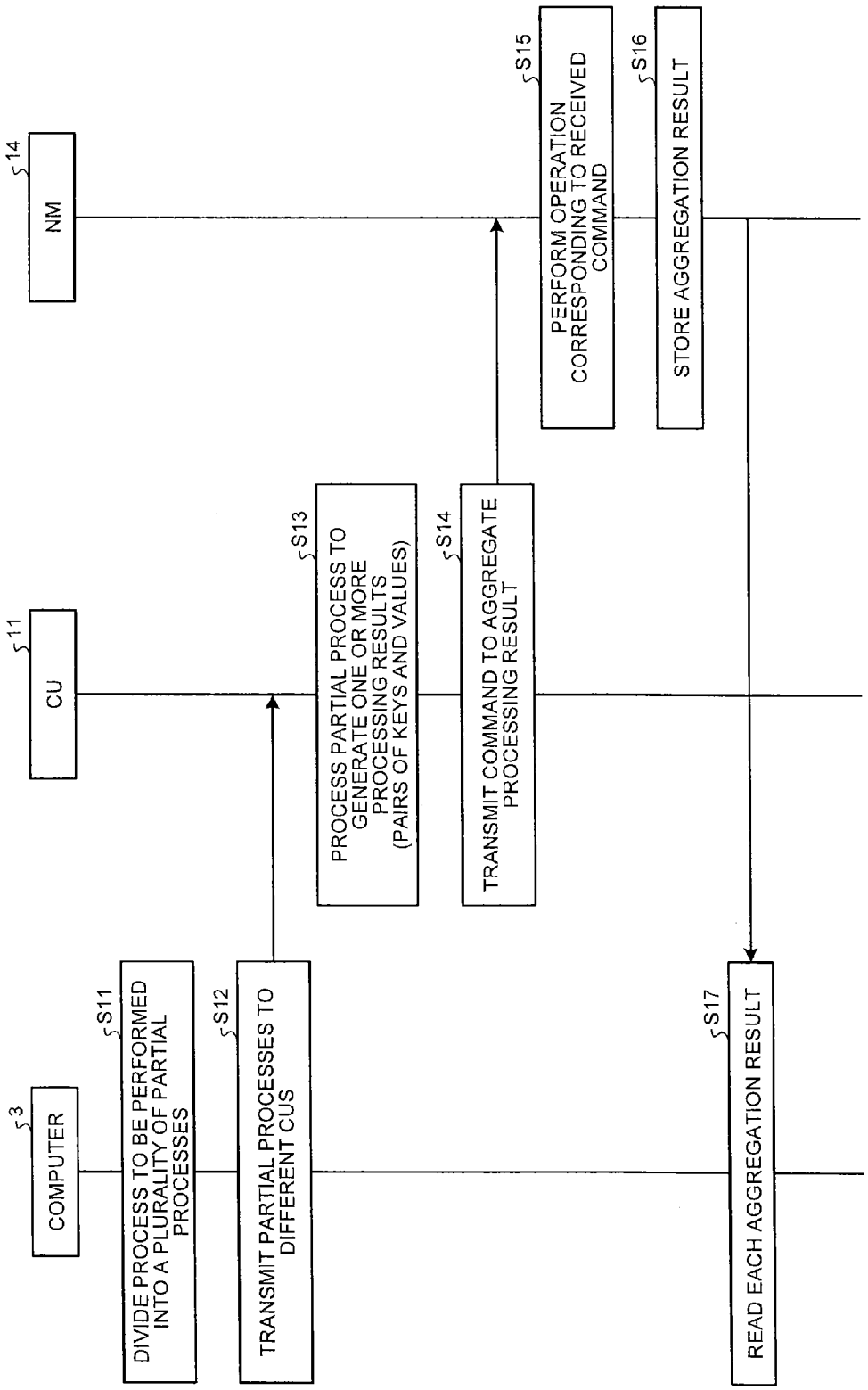
FIG. 13 is a diagram illustrating the operation of a storage system according to a second embodiment.

In the second embodiment, the storage system 1 which implements the function of MapReduce will be described. FIG. 13 is a diagram illustrating the operation of the storage system 1 according to the second embodiment. In the second embodiment, it is assumed that the storage system 1 is mounted with KVS.

First, a computer 3 divides the process which is desired to be performed into a plurality of partial processes (S11). Then, the computer 3 transmits the partial processes to different CUs 11 (S12).

When receiving the partial process, the CU 11 performs the received partial process to generate one or more processing results (S13). Each of the generated processing results has a data format formed by a pair of one key and one value. The CU 11 issues a command to aggregate the processing results for each processing result (S14). The aggregation is performed by an arbitrary operation. The type of operation corresponding to the aggregation is designated by, for example, the computer 3. The packet destination of the command issued in S14 is uniquely specified by the key included in the processing result.

When receiving the command addressed to the NM 14, the NM 14 performs an operation corresponding to the received command (S15). When one or more CUs 11 generate the process results including the same key, the commands generated in S14 are transmitted to the same NM 14. When receiving a plurality of commands, the NM 14 aggregates the values obtained by all of the received commands. The NM 14 stores the aggregation result at a position corresponding to the key in the first memory 141 (S16).

Then, the computer 3 can read from the aggregation result from each NM 14 (S17).

Figure 14:
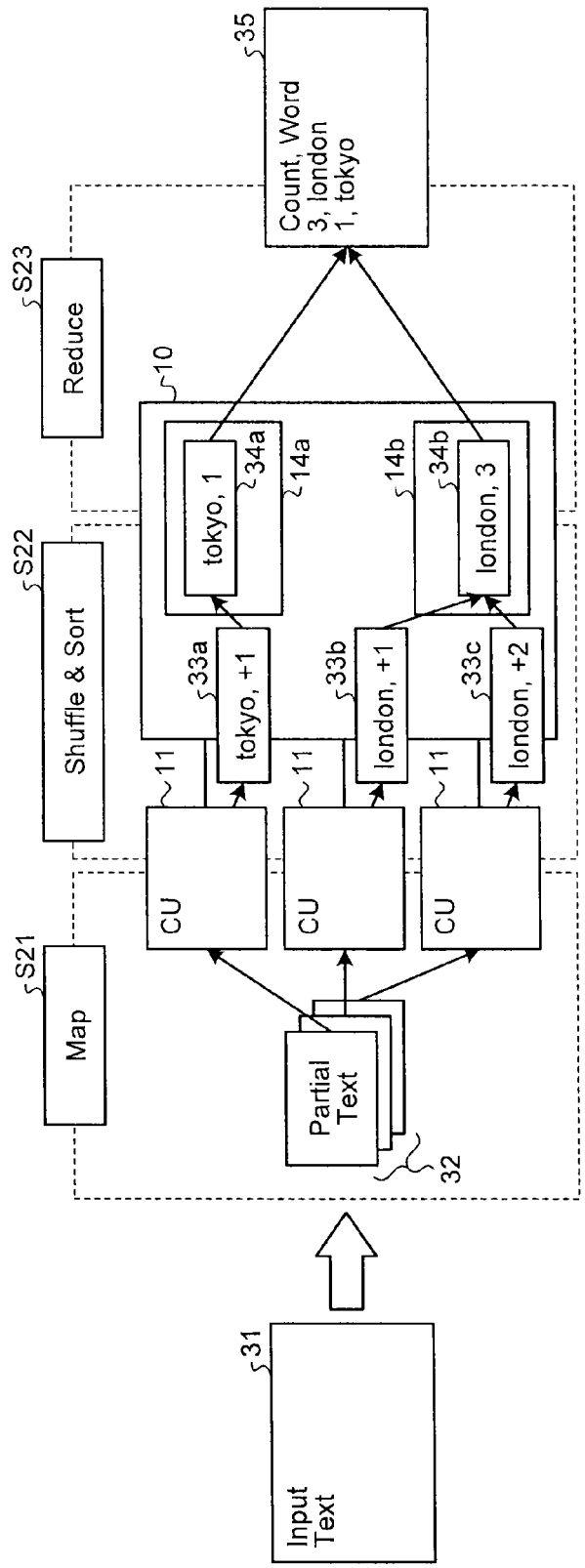
FIG. 14 is a diagram illustrating an example of the detailed operation of the storage system according to the second embodiment.

FIG. 14 is a diagram illustrating an example of the detailed operation of the storage system according to the second embodiment. For example, an operation when words are counted will be described. The words to be counted are "tokyo" and "london".

First, an operation corresponding to the map phase (S21) is implemented. Specifically, an input text 31 is divided into three partial texts 32 by the computer 3. Then, the computer 3 inputs the three partial texts 32 to different CUs 11. A process of counting the word "tokyo" and the word "london" among the words included in the partial text 32 corresponds to a partial process. That is, each CU 11 counts the word "tokyo" and the word "london" among the words included in the input partial text 32.

Then, an operation corresponding to the shuffle and sort phase (S22) is implemented. Specifically, each CU 11 issues a command 33 to aggregate the processing result that is a pair of a key, which is a word, and a value, which is a count value. In the example illustrated in FIG. 14, each CU 11 issues a command 33*a* including the processing result in which "tokyo" is the key and "1" is the value, a command 33*b* including the process result in which "london" is the key and "1" is the value, and a command 33*c* including the processing result in which "london" is the key and "2" is the value. A sign "+" which is added to the value included in each command 33 indicates the type of aggregation operation. Specifically, "+" is a kind of read-modify-write and means an operation for reading a value from the storage position indicated by the key, adding the value included in the command 33 to the read value, and storing the added value at the storage position indicated by the key.

For example, when one CU 11 counts one or more words "london" and one or more words "tokyo", it issued a command 33 having a key "london" and a command 33 having a "tokyo".

The NM 14, which is the packet destination of each command 33, is uniquely specified by the key. The command 33a having "tokyo" as the key is transmitted to a NM 14a as the packet destination. The commands 33b and 33c having "london" as the key are transmitted to a NM 14b as the packet destination. Since each processing result is transmitted to the NM 14 corresponding to the key, the same process as the shuffle and sort phase is implemented.

Then, an operation corresponding to the reduce phase (S23) is implemented. Specifically, in the NM 14a and the NM 14b, an operation corresponding to the received command 33 is performed. In each NM 14, the aggregation operation described in the command 33 is interpreted and performed by the NC 140. For example, in the NM 14a, when receiving the command 33a, the NM 140 writes a value "1" to a storage position 34a corresponding to the key "tokyo". For example, in the NM 14b, when receiving the command 33b, the NM 140 writes a value "2" to a storage position 34b corresponding to the key "london". Thereafter, when receiving the command 33c, the NM 140 reads the value "2" from the storage position 34b corresponding to the key "london" and adds the value "1" recorded in the command 33c to the read value "2". Then, the NM 140 overwrites a value "3" obtained by the addition to the storage position 34b corresponding to the key "london". Then, the computer 3 reads the word count results from the storage positions 34a and 34b corresponding to each key and combines the read results. In this way, the computer 3 can obtain a word count result 35 corresponding to the input text 31.

As such, the storage position of each data item in the memory space formed by a plurality of NMs 14 is specified on the basis of the key. The CU 11 performs the partial process transmitted from the outside and issues the execution result as a command. The command includes the key and the value as the execution result of the partial process. The command is transmitted to the NM 14 which is specified by the key included in the command. The NM 14 which is specified by the key included in the command counts the value included in the command and stores the count result at the storage position corresponding to the key included in the command. In this way, the storage system 1 can implement the function of MapReduce. Since the storage system 1 can implement the function of MapReduce, it is possible to improve the convenience of the storage system 1.

(Third Embodiment)

In the first and second embodiments, the CU 11 includes the MPU 111 and the MPU 110 executes a program to perform various accesses to the storage unit 10 in response to the requests from the outside. The functions of the CU 11 according to the first and second embodiments may be implemented by an external processor.

Figure 15:
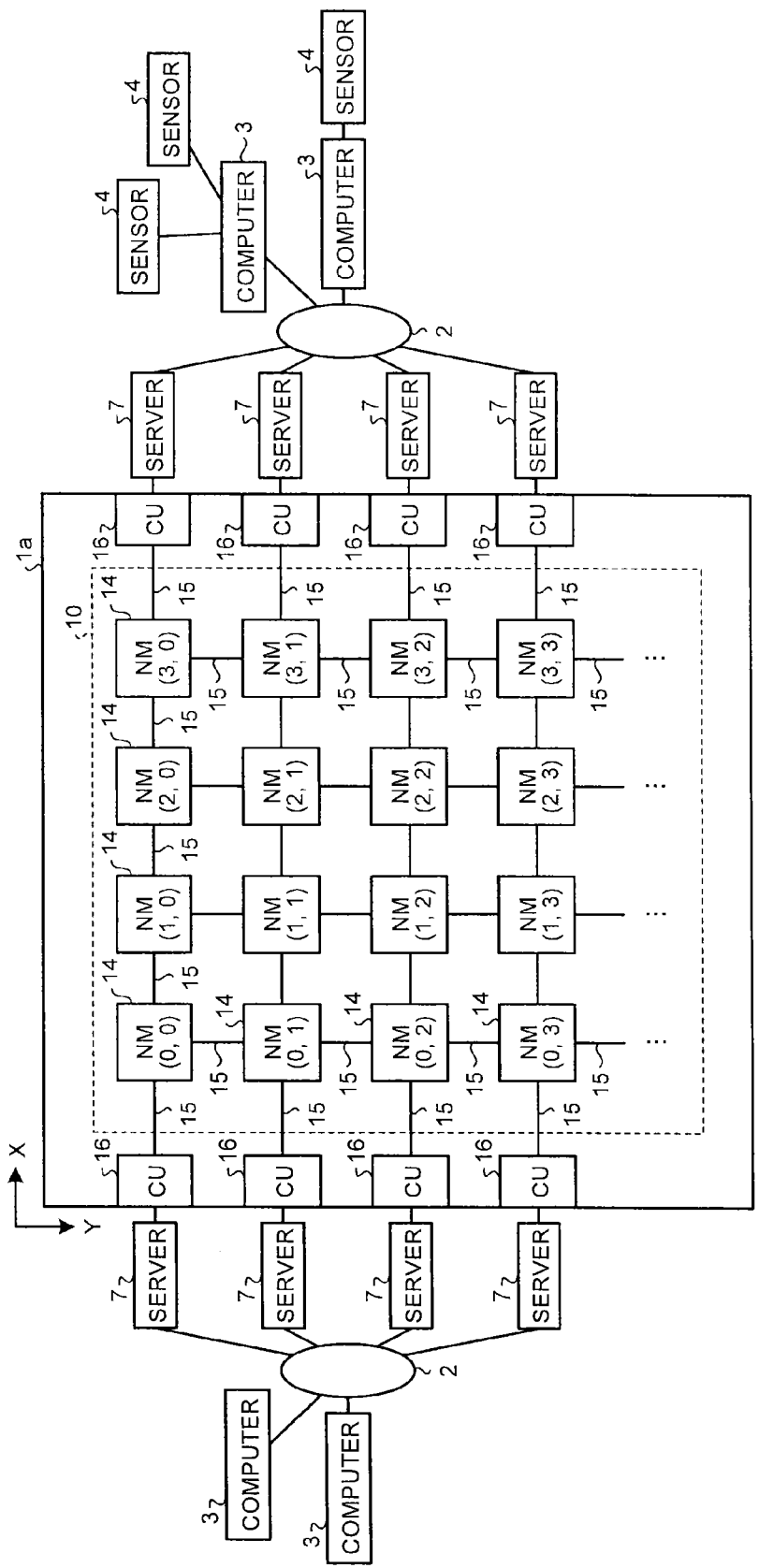
FIG. 15 is a diagram illustrating an example of the operation of a storage system according to a third embodiment.

FIG. 15 is a diagram illustrating an example of the structure of a storage system according to a third embodiment. A storage system 1a is connected to a plurality of (in this embodiment, eight) servers 7. A computer 3 can transmit requests to each server 7 through a network 2. Each server 7 can access the storage system 1a in response to the received request. When accessing the storage system 1a, each server 7 issues the packet illustrated in FIG. 4.

The communication between the server 7 and the storage system 1a is performed on the basis of an arbitrary standard. For example, a standard which can extend the internal bus of the server 7 to the outside of the server 7 using cabling can be used as the communication standard between the server 7 and the storage system 1a. For example, PCI Express can be used as the communication standard between the server 7 and the storage system 1a.

The storage system 1a includes a storage unit 10 and a plurality of CUs 16. The storage unit 10 is configured such that a plurality of NMs 14 are connected to each other by a mesh network.

In the example illustrated in FIG. 15, the storage system 1a includes eight CUs 16. The eight CUs 16 are connected to different NMs 14. In this embodiment, four of the eight CUs 16 are connected one-to-one with a node (0, 0), a node (0, 1), a node (0, 2), and a node (0, 3). The other CUs 16 among the eight CUs 16 are connected one-to-one with a node (3, 0), a node (3, 1), a node (3, 2), and a node (3, 3).

The CU 16 includes a connector which is connected to the server 7. In this embodiment, the CUs 16 are connected one-to-one with the servers 7. The CU 16 transmits packets between the NM 14 and the server 7.

Figure 16:
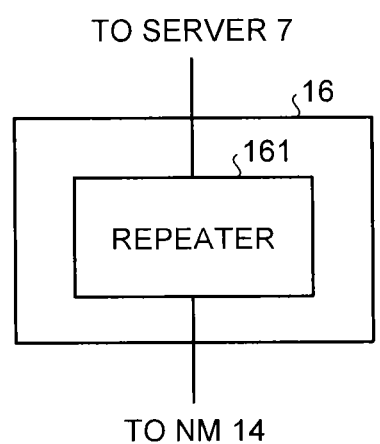
FIG. 16 is a diagram illustrating the structure of a CU according to the third embodiment.

FIG. 16 is a diagram illustrating the structure of the CU 16. The CU 16 includes a repeater 161 therein. The repeater 161 relays packets between the NM 14 connected to the CU 16 and the server 7 connected to the CU 16. When the standard of an interface which connects the server 7 and the CU 16 is different from that of an interface 15 which connects the CU 16 and the NM 14, the repeater 161 may convert the standards.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
   a plurality of memory nodes that are connected to each other in a plurality of different directions; and
   a first processor and a second processor, wherein
   the first processor receives a first request from outside,
   the first processor issues and transmits a first update command whose destination is a first memory node among the plurality of memory nodes by executing the first request, the first update command being a command for updating data, and the first memory node being a memory node storing the data therein,
   the first memory node stores a first count value therein,
   the first memory node, in response to receiving the first update command, executes the first update command, increases the first count value to a second count value, and transmits a first notice of the second count value to the first processor,
   the first processor, in response to receiving the first notice, stores the first request with the second count value therein,
   the second processor receives a second request from the outside,
   the second processor transmits a second update command whose destination is the first memory node, the second update command being a command for updating the data,
   the first memory node, in response to receiving the second update command after receiving the first update command, executes the second update command, increases the second count value to a third count value, and transmits a second notice of the third count value to the second processor, and the second processor, in response to receiving the second notice, stores the second request with the third count value therein.

2. The storage system according to claim 1, wherein the first processor, after the second update command is executed, for restoring first data, issues the first update command again by executing the first request stored in the first processor, the first data being data updated in accordance with the first update command by the first memory node.

3. The storage system according to claim 1, wherein a memory node among the plurality of memory nodes stores a corresponding count value for a corresponding data item.

4. The storage system according to claim 1, wherein a second memory node which is different from the first memory node among the plurality of memory nodes, in response to receiving the first or second update command, transfers the received first or second update command to the first memory node.

\* \* \* \* \*